United States Patent [19]

Shibaike

[11] Patent Number: 4,763,214
[45] Date of Patent: Aug. 9, 1988

[54] HEAD DRIVE MECHANISM FOR ELECTRONIC STILL CAMERA

[75] Inventor: Narito Shibaike, Osaka, Japan

[73] Assignee: Matsushita Electric Industrial Co., Ltd., Osaka, Japan

[21] Appl. No.: 924,531

[22] Filed: Oct. 29, 1986

[30] Foreign Application Priority Data

| Nov. 1, 1985 | [JP] | Japan | 60-246569 |
| Nov. 1, 1985 | [JP] | Japan | 60-246571 |
| Nov. 1, 1985 | [JP] | Japan | 60-246572 |
| Nov. 1, 1985 | [JP] | Japan | 60-246573 |
| Dec. 16, 1985 | [JP] | Japan | 60-283391 |
| Apr. 15, 1986 | [JP] | Japan | 61-86473 |

[51] Int. Cl.$^4$ .................. G11B 5/55; G11B 21/08
[52] U.S. Cl. .................. 360/106; 360/96.6; 360/97; 360/99
[58] Field of Search .................. 360/106, 96.5, 96.6, 360/97-99

[56] References Cited

U.S. PATENT DOCUMENTS 4,630,147 12/1986 Nagase .................. 360/106
4,630,159 12/1986 Saito .................. 360/99

FOREIGN PATENT DOCUMENTS 2151594 4/1973 Fed. Rep. of Germany .

Primary Examiner—Robert S. Tupper
Attorney, Agent, or Firm—Pollock, VandeSande & Priddy

[57] ABSTRACT

Disclosed is a recording apparatus which is capable of efficiently driving a recording head with simple construction. The recording apparatus includes first and second slide members which are coupled through a spring to each other. The first slide member is arranged to be movable in response to the setting of a recording sheet holding cassette into a cassette receiving section of the recording apparatus and locked by a stopper member in response to the termination of the cassette setting. The movement of the first slide member generates a biasing force of the spring between the first and second slide members, and the generated biasing force is transferred through a transmission mechanism to the recording head so that the recording head moves along the recording sheet of the cassette. When released from the stopper member, the first slide member is moved together with the second slide member in the direction opposite to the cassette-setting direction and this causes the recording head to return to its initial position.

19 Claims, 10 Drawing Sheets

HEAD DRIVE MECHANISM FOR ELECTRONIC STILL CAMERA

BACKGROUND OF THE INVENTION

The present invention relates generally to an electronic still camera, and more particularly to a drive system for mechanically driving a magnetic head to record information on a magnetic sheet set in a cassette.

Generally, a recording apparatus of the type wherein information tracks are formed on a recording sheet in accordance with the movements of a magnetic head is arranged so that the rotational movement of a stepping motor is converted into a linear movement of the magnetic head through a device such as a steel belt, feed screw, cam, etc.

However, an important problem in portable type recording apparatus, particularly electronic still camera, relates to the need for a head drive system which is light in weight and small in size in order to meet the requirements for compact construction. One possible solution is to mechanically move the magnetic head using a biasing force in a predetermined direction. While this is realized, for example, by employing a solenoid and a ratchet mechanism and moving the magnetic head against a biasing force, such a head drive mechanism does not provide satisfactory results with respect to effective biasing force supply.

SUMMARY OF THE INVENTION

It is therefore an object of the present invention to provide a new and improved recording apparatus with a head drive mechanism which is capable of effectively driving a recording head with simple structure.

With this object and various features which will become apparent as the description proceeds, a recording apparatus according to the present invention basically comprises a first slide member movable in response to the setting of a magnetic sheet holding cassette in a cassette receiving section of the recording apparatus, a second slide member coupled through a first spring to the first slide member to receive a biasing force resulting from the first spring in accordance with the movement of the first slide member caused by the setting of the cassette, and transmission mechanism for transferring the biasing force applied to the second slide member to a recording head so that the recording head is movable in the radial direction of the magnetic sheet encased in the cassette.

The first slide member is coupled through a second spring to a base plate of the recording apparatus so that it is moved by the cassette against the second spring. The first slide member is adapted to be locked by a stopper member in response to the termination of the setting of the cassette into the cassette receiving section. The transmission mechanism includes ratchet means arranged to rotated in stepwise fashion in a direction in accordance with the movement of the second slide member caused by the biasing force of the first spring generated between the first and second slide members, so that the recording head move along the magnetic sheet to record information thereon.

On the other hand, when the first slide member is released from the stopper member at the time of the termination of recording, it is moved by the biasing force of the second spring in the direction opposite to the direction of the setting of the cassette; and the movement of the first slide member causes the removal of the cassette. At this time, the second slide member is also moved together with the first slide member in the same direction and the movement of the second slide member causes the ratchet means to rotate in the direction opposite to the direction rotated in response to the biasing force of the first spring. The rotation of the ratchet means allows the recording head to return to its initial position.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1A:
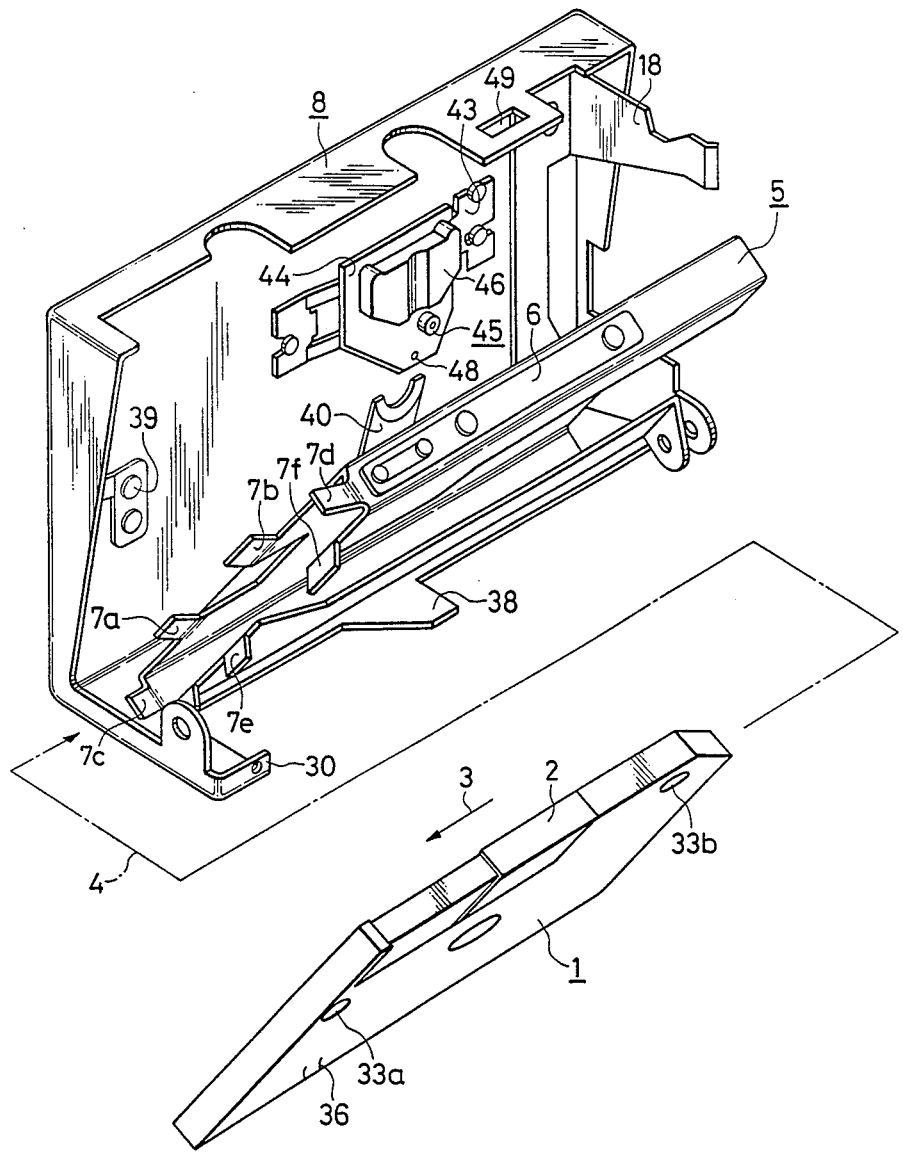
FIG. 1A is a perspective view showing a garage and compartment of a recording apparatus according to the present invention.
Figure 1B:
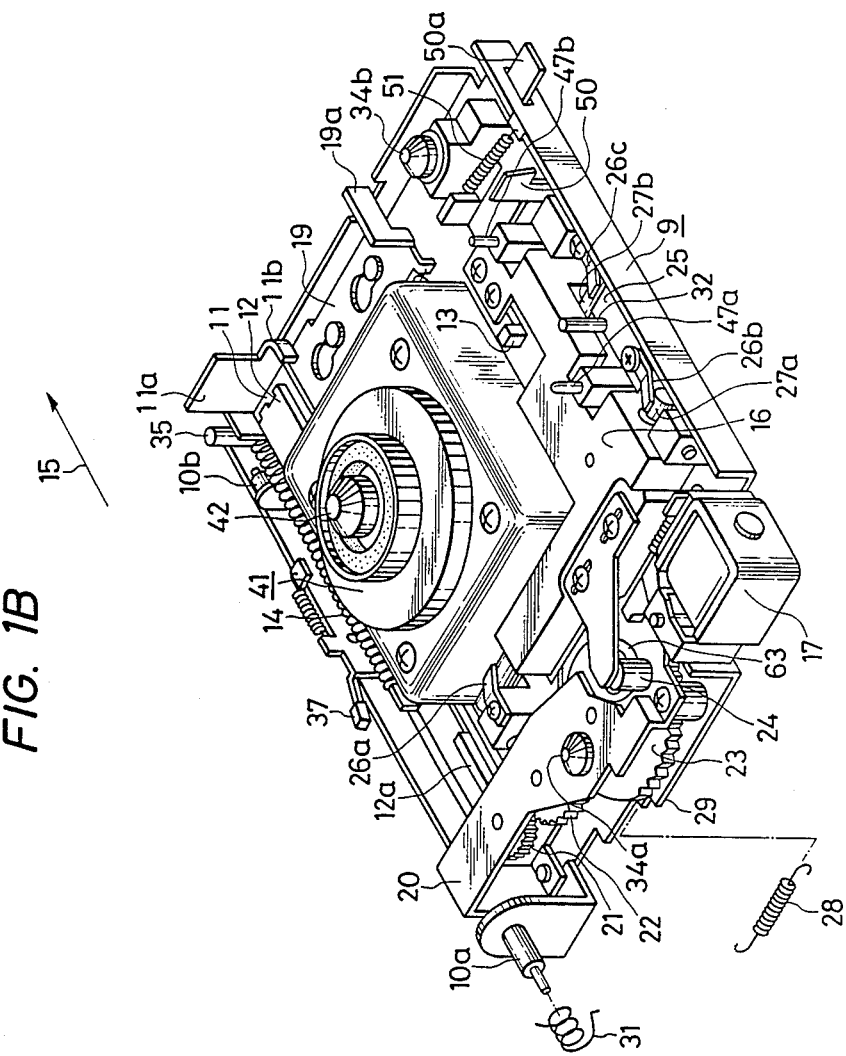
FIG. 1B is a perspective view illustrating an arrangement of a recording head drive section of a recording apparatus according to the present invention.

Referring now to FIGS. 1A and 1B, there is schematically illustrated a recording apparatus according to the present invention. Designated at reference numeral 1 (FIG. 1A) is a cassette in which a magnetic sheet is encased. The cassette 1 has a head insertion inlet (which will be described hereinafter) which is normally covered by a shutter 2 movable in the direction indicated by an arrow 3. When the cassette 1 is slidingly inserted into a compartment 5 from the direction of an arrow 4, the shutter 2 will be opened with the aid of a shutter releasing device 6 provided on the compartment 5. On the other hand, when the cassette 1 is removed from the compartment 5, it will be automatically closed by the shutter releasing device 6. The compartment 5 has, at the cassette insertion side, a plurality of guide pieces 7a to 7f to enable easy insertion of the cassette 1. A garage 8 is disposed at the outer side of the compartment 5, and the garage 8 and the compartment 5 are pivotally coupled through support shafts 10a and 10b (FIG. 1B) to a base plate 9 of the recording apparatus. The support shafts 10a and 10b are disposed such that their axes are parallel to the direction of the cassette insertion, i.e., the direction of the arrow 4. The cassette 1 is adapted to be inserted into the compartment 5 with it being inclined with respect to the base plate 9.

Further included in the recording apparatus according to this invention, shown in FIG. 1B, are two slide plates 11 and 12 each of which respectively has an elongated configuration and which are disposed in up and down relation to each other, that is, they are overlapped by each other. In the figure, the slide plate 12 is disposed at the upside of another slide plate 11. The cassette 1 is operatively associated with the slide plate 11, that is, the slide plate 11 is slidable in response to the insertion of the cassette 1. During the insertion, one end of the cassette 1 comes into contact with a bent portion 11a of the slide plate 11 and depresses it in the insertion direction indicated by an arrow 15 in FIG. 1B. The slide plates 11 and 12 are coupled to each other through a spring 14, and the slide plate 11 is coupled through another spring 60 (which will be described hereinafer) to the base plate 9. Therefore, the insertion of the cassette 1 is performed against the spring forces and generates biasing force of the springs 14 and 60. The bent portion 11a has a hook 11b and, when the insertion of the cassette 1 has been completed, the hook 11b is arranged to be catched with a stopper plate 19, whereby the generated biasing forces of the springs 14 and 60 remain charged. The slide plates 11 and 12 respectively function as a biasing-force charging member. The biasing force generated between the slide plates 11 and 12 is used for driving a recording head 13, which will be described in detail hereinafter.

When the garage 8 is opened as shown in FIG. 1A (FIG. 1A shows the state when the garage 8 is opened at a greater degree than the actually opened degree, for the purpose of illustration), a release spring plate 18 connected to the garage 8 is engaged with, or comes into contact with, a protruding portion 19a of the stopper plate 19 to move the stopper plate 19 so that the hook 11b of the slide plate 11 can be disengaged from the stopper plate 19 and be released therefrom. In response to the release from the stopper plate 19, the slide plate 11 is moved by the urging force of the spring 60 in the opposite direction with respect to the direction indicated by the arrow 15. This opposite direction movement causes the cassette 1 to be discharged by the bent portion 11a from the compartment 5 to the outside thereof. At the same time, the biasing force between the slide plates 11 and 12 is lost and the slide plate 11 depresses the slide plate 12, and the movement of the slide plate 12 caused thereby is delivered through a rack 12a, and gears 21, 22 to a ratchet 23 so that a cam 63 returns to the initial position (which will be in detail described hereinafter). In response to the return of the cam 63 to the initial position, a slider 16 brings the recording head 13 back to its initial position. The slider 16 is moved along slide shafts 27a and 27b held by presser springs 26a to 26c (leaf springs) and an adjusting screw (which will be described hereinafter). The slider 16 is normally spring-urged toward the cam 63 so that the cam 63 comes into contact with a cam follower 24.

The garage 8 is associated with the base plate 9 through a spring 28, that is, one end of a spring 28 is coupled to a spring-connecting portion 29 of the base plate 9 and the other end thereof is coupled to a spring-connecting portion 30 so that the garage 8 is biased in the direction that it is opened, that is, it is swingingly separated from the base plate 9. The compartment 5 is urged by a spring 31 in the direction when it is separated from the garage 8.

When the garage 8 is moved downwardly to be closed after the cassette 1 is inserted into the compartment 5, the compartment 5 is moved downwardly together with the garage 8 and then comes into contact with a height-determining pin 32, and the cassette 1 is positioned because positioning pins 34a, 34b are respectively fitted in positioning holes 33a, 33b of the cassette 1 and also positioned in height by the positioning pins 34a, 34b and a height-determining pin 35. When the compartment 5 is closed, a switch 37 to be associated with a safety lug 36 of the cassette 1 is still pressed by a projecting portion 38 of the garage 8 and moves up to a position separated from the cassette 1 (which will be described hereinafter). Thereafter, when the garage 8 is further moved downwardly, the cassette 1 is held by a presser spring 39 and an insertion spring 40 causes a center core (which will be described hereinafter) to be engaged with a spindle 42 of a motor 41. Furthermore, a pad 46 and a PG (pulse generator) 45 are attached to a pad plate 44 held onto the garage 8 by a pad spring 43, and they come into contact with height-determining pins 47a, 47b. In addition, a height adjusting screw 48 attached to the pad plate 44 comes into contact with the center portion of the spindle 42 for height-positioning. Thereafter, a locking hole 49 defined in the garage 8 is engaged with a locking member 50 so that the garage 8 is secured to the base plate 9. The connection between the locking hole 49 and the locking member 50 can be released by pressing a push member 50a against a spring 51.

A more detailed description of the recording apparatus according to the present invention will be made hereinbelow with reference to FIGS. 2 to 12.

Figure 2:
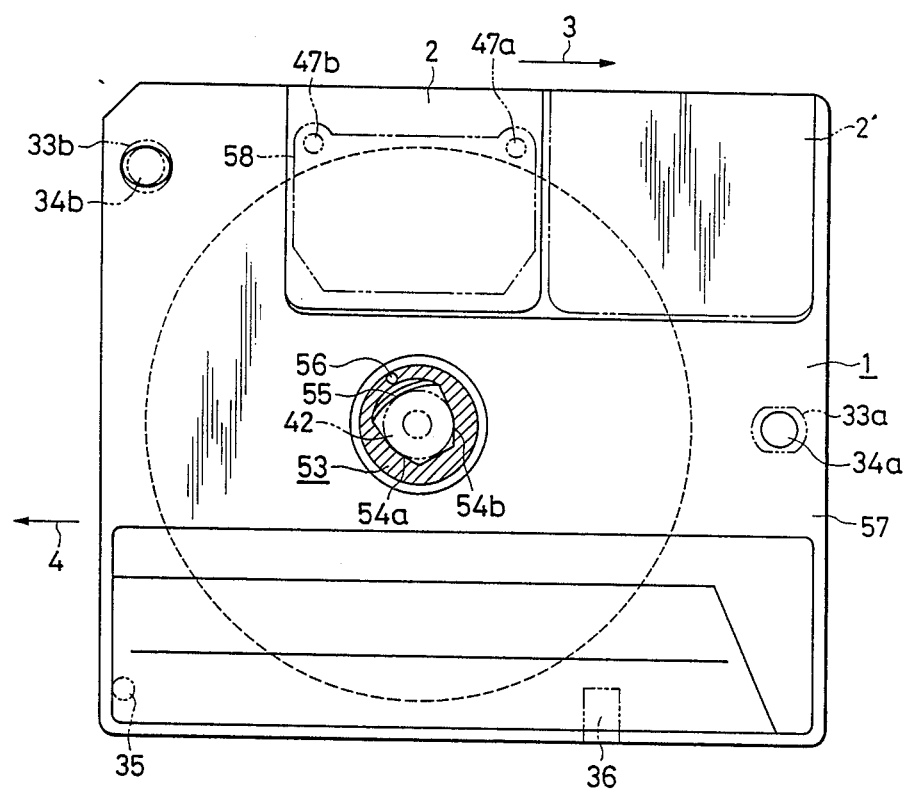
FIG. 2 is an illustration of a magnetic sheet holding cassette used for a recording apparatus of this invention.

FIG. 2 is an illustration of a cassette used for the recording apparatus according to the present invention.

A magnetic sheet 52 encased in the cassette 1 is provided around a center core 53, which is provided with positioning walls 54a, 54b, and a positioning spring 55 for positioning it with respect to the spindle 42. A PG yoke 56 is also provided thereon. A housing 57 has the positioning holes 33a, 33b which are engaged with the positioning pins 34a, 34b. Illustrated at numeral 58 are a pair of windows which are provided at opposite sides of the cassette 1 and which are exposed when the shutter 2 is slid up to the position indicated by numeral 2'. The height-determining pins 47a, 47b pass through the window 58 to come into contact with the pad 46.

Figure 3:
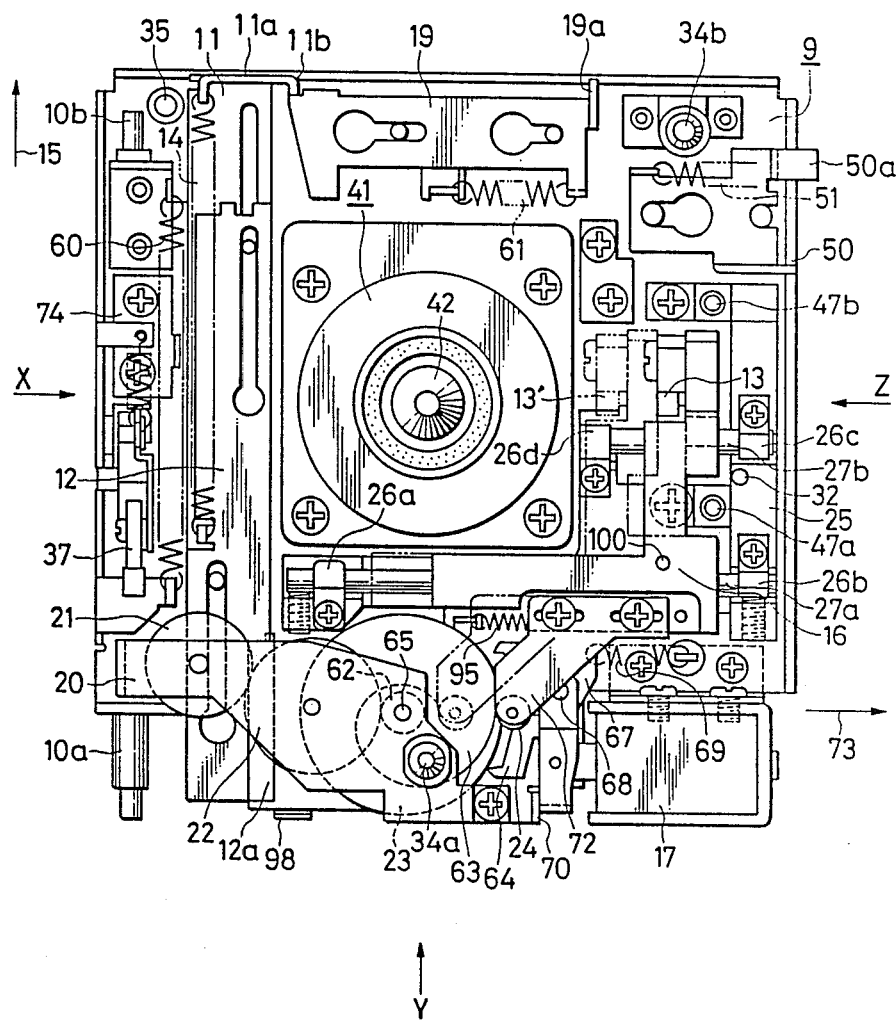
FIG. 3 is a top view showing the head drive section illustrated in FIG. 1B.

FIG. 3 is a top view showing an arrangement, except for the cassette 1 and garage 8, of the recording apparatus according to this invention.

Figure 4:
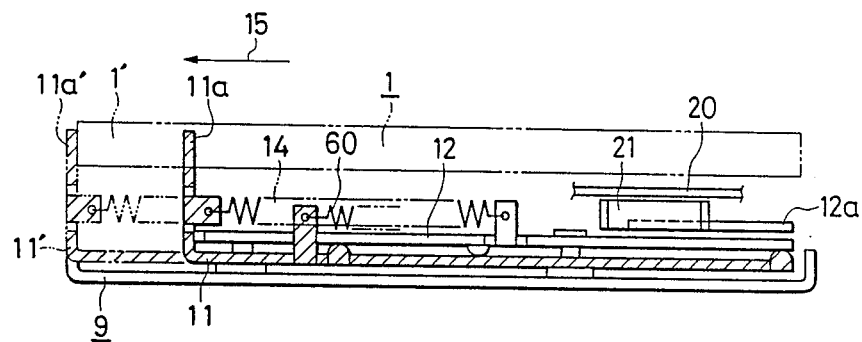
FIG. 4 is a cross-section of the recording apparatus viewed from the direction of an arrow X in FIG. 3.

The slide plate 11 is slidingly moved against the spring 60 in the direction indicated by arrow 15 with the cassette 1 being inserted into the compartment 5 and is locked by the stopper plate 19 at a predetermined position (corresponding to the termination position of the cassette insertion) as illustrated in FIG. 4 which is a cross-section viewed from the direction of an arrow X of FIG. 3. While the slide plate 11 is not released from the stopper plate 19 when it is the garage 8 is moved downwardly, when moved upwardly, the release spring plate 18 (FIG. 1A) presses the protruding portion 19a of the stopper plate 19 against a spring 61, which is provided between the base plate 9 and the stopper plate 19. Therefore, the engagement between the slide plate 11 and the stopper plate 19 is released; and the slide plate 11 can be moved in the direction opposite to the direction of the arrow 15 under the biasing force caused by the spring 60. On the other hand, the slide plate 12 is moved together with the slide plate 11. The movement of the slide plate 12 is delivered through gears 21, 22, 62 and the ratchet 23 to the cam 63, resulting in rotation of the cam 63, as seen from FIG. 5 which is a cross-section viewed from the direction of an arrow Y in FIG. 3.

Figure 6A:
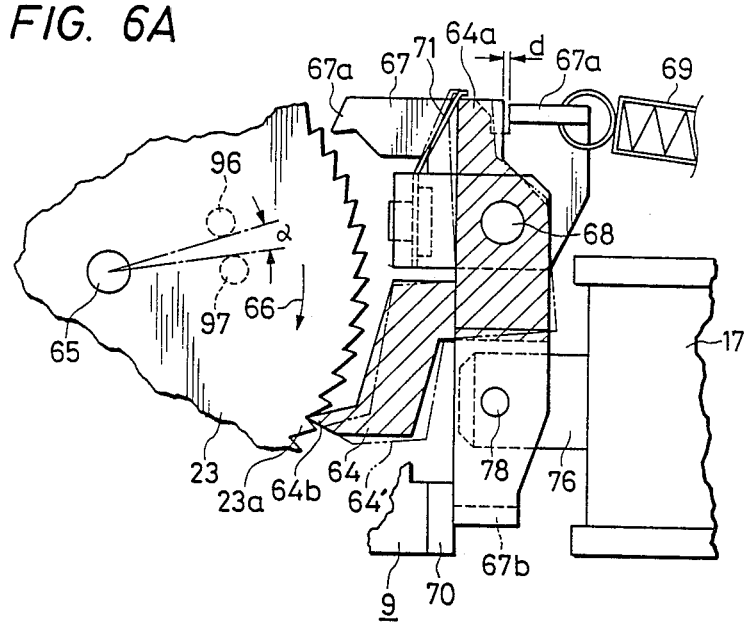
FIGS. 6A and 6B are illustrations of a ratchet mechanism employed for the recording apparatus of this invention.
Figure 6B:
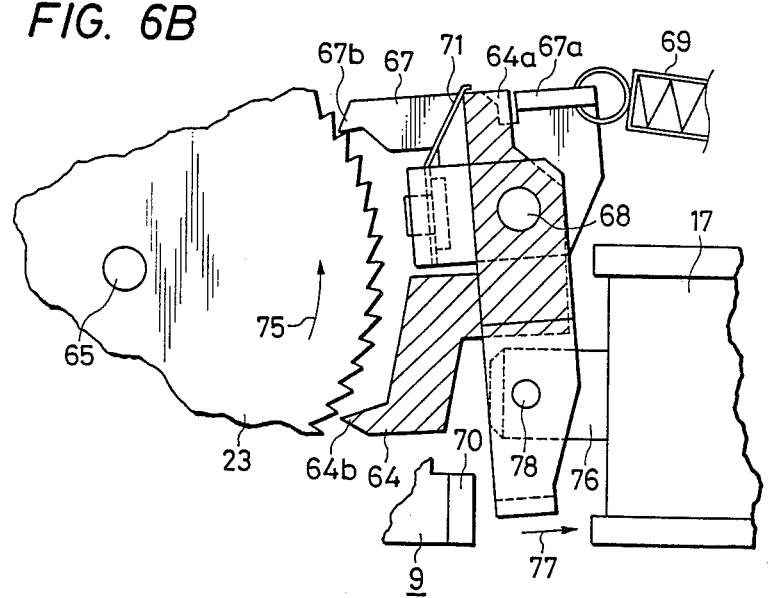

Referring to FIGS. 6A and 6B, there is illustrated a ratchet mechanism including the ratchet 23. The ratchet 23 is adapted to be engaged with a pointer 64 and a counter lever 67. The ratchet 23 is urged to be rotated about a shaft 65 in the direction indicated by an arrow 66 due to the biasing force of the spring 60 applied to the slide plate 12 in response to the release of the slide plate 11 and is urged to be rotated thereabout in the direction indicated by an arrow 75 due to the movement of the slide plate 12 caused by the biasing force of the spring 14 between the slide plates 11 and 12. Here, the ratchet 23 is rotatable in the direction of the arrow 66 because the pointer 64 is movable outwardly about a shaft 68 as illustrated at numeral 64', that is, the pointer 64 does not block the movement of the ratchet 23 in the direction thereof. This depends on the tooth shape of the ratchet 23. The counter lever 67 is rotatable about the shaft 68 of the pointer 64. One end portion 67a of the counter lever 67 is biased clockwise by means of a spring 69 and the other end portion 67b thereof abuts against a stopper portion 70 of the base plate 9. The counter lever 67 is provided with a spring 71 which biases the pointer 64 toward the ratchet 23. Here, it is appropriately arranged to bias the pointer 64 by providing a spring between the base plate 9 and the pointer 64, in place of the spring 71. One end portion 64a of the pointer 64, being biased by the spring 71, forms a space d with respect to the one end portion 67a of the counter lever 67 because a pawl portion 64b of the pointer 64 is abutting against the ratchet 23. The space d is formed so that the counter lever 67 is not affected by the movement of the pointer 64. The spring force of the spring 71 is not great and the biasing force thereof does not greatly affect the movement of the slide plate 12. Therefore, a mechanism to release the pawl portion 64b from the ratchet 23 is not required when the cam 63 is returned to its initial position, resulting in a simple construction.

The slide plate 11 being moved by the spring 60 is stopped at a predetermined position by a stopper 74 and the stopped state is kept. At this time, the ratchet 23 rotates the cam 63 up to the predetermined angular position with a tooth portion 23a of the ratchet 23 being engaged with the pawl portion 64b so that the recording head 13 is returned to its initial position. However, there is the possibility of the occurrence of overrun of the ratchet 23 and movement of the cam 63 beyond the predetermined position due to a play of the gears and inertia force of the ratchet 23, resulting in inaccurate positioning of the recording head 13. To eliminate this problem, a stoper pin 96 is provided at the ratchet 23 so that the axis of the stopper pin 96 is substantially normal to the surface of the ratchet 23 and another stopper pin 97 is provided to the base plate 9 so that the axis of the stopper pin 97 is substantially normal to the surface of the base plate 9. These stopper pins 96 and 97 are in parallel to each other and positioned to form a space $\alpha$ when the slide plate 11 or 12 has been stopped by the stopper 74. When the overrun occurs, the stopper pin 96 strikes against the stopper pin 97 so that a further advancing of the ratchet 23 is prevented irrespective of the occurrence of overrun, and the recording head 13 is accurately returned to its initial position. The space $\alpha$ is a distance in a range that the pointer 64 does not advance to the next tooth of the ratchet 23. Here, the impact force caused by the spring 60 is absorbed by the stopper 74 and therefore the stopper pins 96, 97 are scarcely affected by the impact force.

As described above, in response to the opening of the garage 8, the cassette 1 is discharged from the compartment 5 and the cam 63 is returned to its initial position. The return of the cam 63 to its initial position causes the recording head 13 to be returned to its initial position. Here, it is also possible to further use ejector means to directly bring the recording head 13 to a predetermined position. The following is a description of the situation when the recording head 13 is returned to the predetermined position by means of the ejector means, the description will be described with reference to FIGS. 8 and 9.

A head plate 98 is moved in the direction of an arrow 99 up to the position illustrated at numeral 98' by means of an ejecting lever 101 (which will be described hereinafter) prior to the movement of the slide plate 12. The ejecting lever may be actuated by an external force. The movement of the head plate 98 is delivered to the slider 16 to release the cam follower 24 from the cam 63. The slider 16 is provided with a head pin 100 which passes through a slide block 25 and the base plate 9 and may be engaged with a projecting portion 98a of the head plate 98 at the rear side of the base plate 9. The projecting portion 98a thereof normally provides a space e1 with respect to the head pin 100 positioned when the recording head 13 is advanced most inwardly. The head plate 98 is moved by a distance designated at S1, that is, the head plate 98 is moved up to a position 100" farther by e2 than the position indicated by 100' (most outward poistion of the recording head 13, i.e., the first track position). In other words, the stroke distance S1 of the head plate 98 is longer than the distance S2 required to move the recording head 13 to its initial recording position. In this case, since the cam 63 does not come into contact with the cam follower 24, the cam 63 is easily returned to its initial position and this makes it possible to reduce the strength of the spring 60, resulting in easy insertion of the cassette 1 into the compartment 5. Further using the ejector means as a moving mechanism of the recording head 13 is greatly advantageous for precise positioning.

Figure 9:
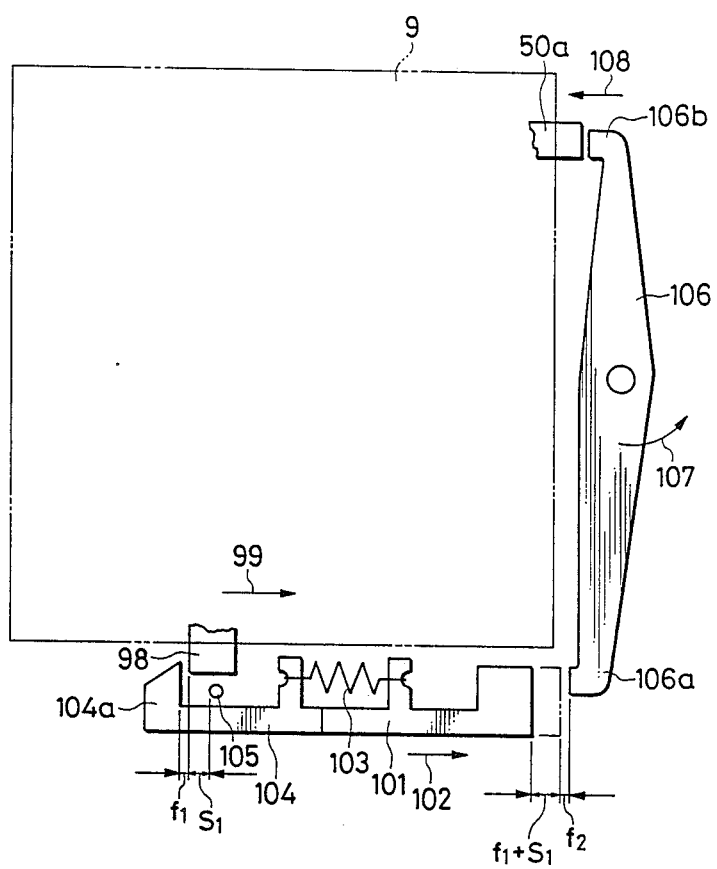
FIG. 9 is a schematic diagram showing an arrangement of the ejector.

The ejecting lever 101, as illustrated in FIG. 9, is coupled through a spring 103 to an engaging lever 104 so that the movement of the ejecting lever 101 in the direction of an arrow 102 causes the movement of the engaging lever 104 in the same direction. The engaging lever 104 moves the head plate 98 in the direction of the arrow 99, resulting in movement of the recording head 13. An engaging portion 104a of the engaging lever 104 is spaced by a distance f1 with respect to the head plate 98. The engaging portion 104a thereof bumps against a stopper 105 when moved by the addition of the space f1 and the head plate stroke distance S1. At this time, the recording head 13 is returned to the predetermined position. The ejecting lever 101 is further moved by a distance f2 against the spring 103 and comes into contact with one end portion 106a of a release lever 106 and rotates it in the direction indicated by an arrow 107. This causes the other end of the release lever 106 to press the push member 50a of the locking member 50 in the direction of an arrow 108, so that the garage 8 is released from the locking member 50 and opened. That is, the recording head 13 is moved up to the predetermined position that the cam 63 is separated from the cam follower 24 by moving the engaging lever 104 by the distance (f1+S1) and then the garage 8 is released by further moving the ejecting lever 101 by a predetermined distance (more than f2) that enables the release lever 106 to sufficiently press the locking member 50. According to this arrangement, because the cam 63 is separated from the cam follower 24, it is possible to reduce the load for the movement of the recording head 13 and to avoid the impact to the recording head 13.

Next, a description will be made with respect to insertion of the cassette 1.

As shown in FIG. 4, the cassette 1 is inserted substantially parallel to the surface of the base plate 9, or in other words the cassette 1 is inserted with the longitudinal axis thereof parallel to the axes of the shafts 10a and 10b, and moves the slide plate 11 in the direction of the arrow 15 up to the position indicated by numeral 11', as described above. On the other hand, the slide plate 12 is not moved with the movement of the slide plate 11 because the ratchet 23 is engaged with the pointer 64 as shown in FIG. 6A. Therefore, A tensile force is generated by the spring 14 between the slide plates 11 and 12, the slide plate 12 being urged toward the slide plate 11, i.e., the direction of the arrow 15. The tensile force is delivered to the ratchet 23 which is in turn forced in the opposite arrow to the direction 66 in FIG. 6A, i.e., a direction indicated by an arrow 75 in FIG. 6B.

Figure 8:
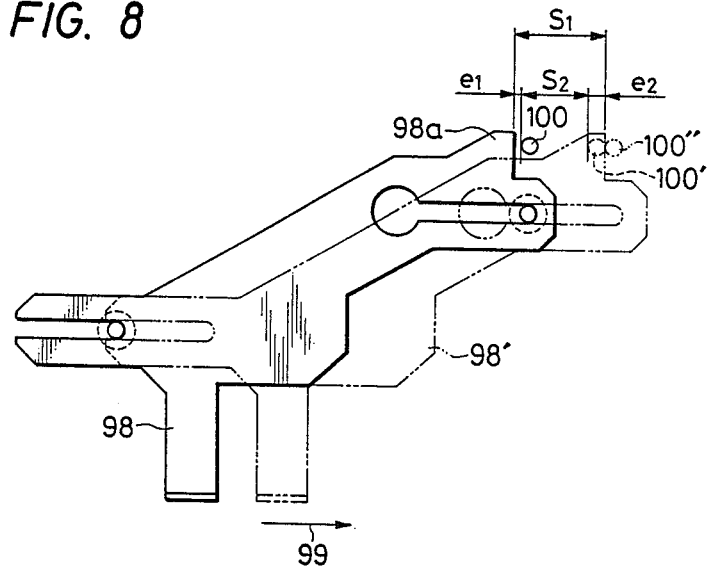
FIG. 8 is an illustration of a head plate of an ejector which may be employed for the recording apparatus of the invention.

In the case that the ejector means shown in FIGS. 8 and 9 is employed, in response to the closing of the garage 8, the head plate 98 is returned to its initial position and the head pin 100 becomes released, and therefore the slider 16 is moved by a spring 95 so that the cam follower 24 comes into contact with the cam 63 and thereby the recording head 13 is set to its initial position (recording start postion).

Under this condition, when a solenoid 17 is energized, a solenoid shaft 76, as shown in FIG. 6B, is moved in the direction indicated by an arrow 77. The counter lever 67 is coupled through a pin 78 to the solenoid shaft 76, and therefore it is rotated counterclockwise against the spring 69. As a result, the end portion 67a of the counter lever 67 presses the projecting portion 64a of the pointer 64 so that the pointer 64 is rotated to be disengaged with the ratchet 23. At this time, the pawl portion 67b of the counter lever 67 is moved in the direction engaged with the ratchet 23. Because the ratchet 23, as described above, is urged in the direction of the arrow 75, the ratchet 23 is rotated until the tooth portion thereof 23a comes into contact with the end portion 67a. The rotating amount of the ratchet 23 corresponds to the tooth spacing (pitch). Thereafter, when the solenoid 17 is deenergized, the pointer 64 is returned by the spring 69 to the state shown in FIG. 6A. At this time, the cam 63 is rotated a predetermined amount and thereby the slider 16 is moved by an amount corresponding to the rotating amount of the cam 63. Therefore, the recording head 13 is moved in the opposite direction to the direction 73 (FIG. 3) by a distance corresponding to the recording track interval. The power of the solenoid 17 only depends upon the force of the spring 69 and the frictional force between the ratchet 23 and pointer 64, resulting in a small-sized solenoid. Furthermore, the space d is formed between the pointer 64 and counter lever 67 as described above and causes the counter lever not to affect the positioning of the recording head 13.

Figure 7A:
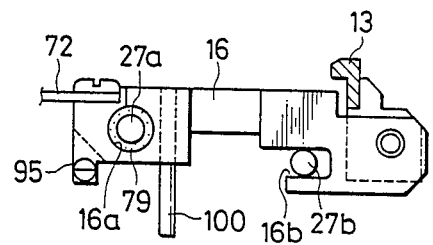
FIG. 7A is a side view showing a recording head carrying mechanism used for the recording apparatus of this invention.
Figure 7B:
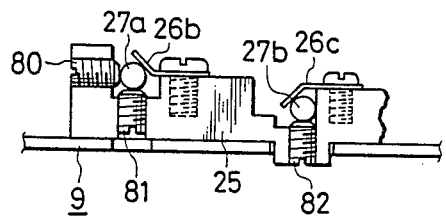
FIG. 7B is a side view showing the recording head carrying mechanism.

FIGS. 7A and 7B are illustrations useful for describing the slider 16 and its associated members.

The recording head 13 is secured to the slider 16 which is guided by the slide shafts 27a and 27b which are substantially parallel to each other. The slide shaft 27a is inserted into a hole 16a of the slider 16. Numeral 79 represents a bush. On the other hand, the slide shaft 27b is fitted in a groove 16b defined in the slider 16. Therefore the slider 16 is positioned by the slide shafts 27a and 27b. The slide shaft 27a is held by two adjusting screws 80, 81 and the pressing spring 26b with respect to the slide block 25, and is adjustable in up-and-down and right-and-left positions by means of the two adjusting screws 80 and 81. The other end portion of the slide shaft 27a, not shown, is similarly held. The slide shaft 27b is held by an adjusting screw 82 and pressing spring 26c so as to be adjustable in up-and-down positions. The other end portion of the slide shaft 27b, not shown, is similarly held with the same arrangement. Thus, since the slide shafts 27a and 27b are respectively adapted to be adjustable in position, it is possible to accurately position the recording head 13 over all track formations. Furthermore, the relationship in position between the cam 63 and the slider 16 is adjustable by means of an adjusting plate 72.

A description will be given hereinbelow with respect to the opening and closing of the garage 8 with reference to FIGS. 10A and 10B.

Figure 5:
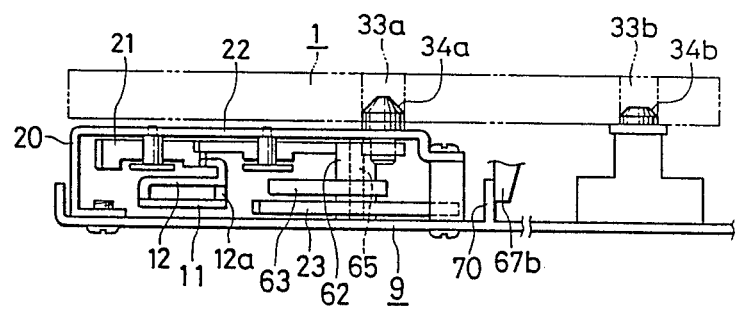
FIG. 5 is a cross-section of the recording apparatus viewed from the direction of an arrow Y in FIG. 3.

In the recording apparatus according to the present invention, account is taken with respect to the garage 8 being opened as little degree as possible for the insertion and removal of the cassette 1. For example, the positioning pins 34a and 34b for positioning the cassette 1 are positioned away from the support shafts 10a and 10b for the garage 8 and compartment 5 as shown in FIG. 5. Minimizing the opening degree of the garage 8 results in prevention from entering of dust and so on.

Figure 10A:
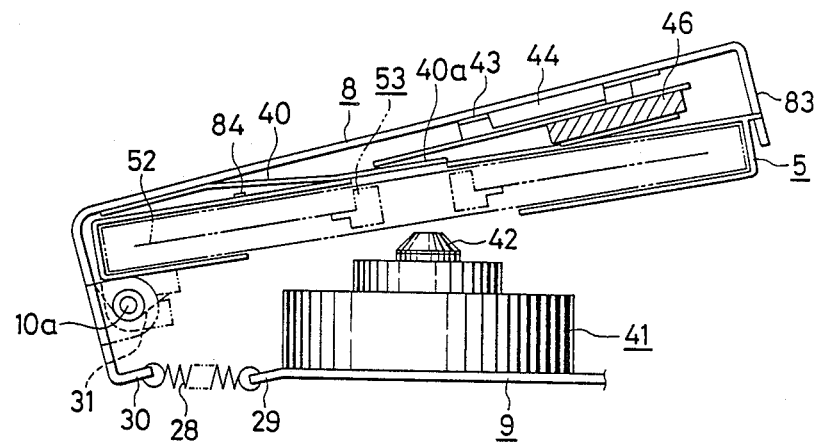
FIG. 10A is a cross sectional view showing the state when the garage of the recording apparatus is opened.
Figure 10B:
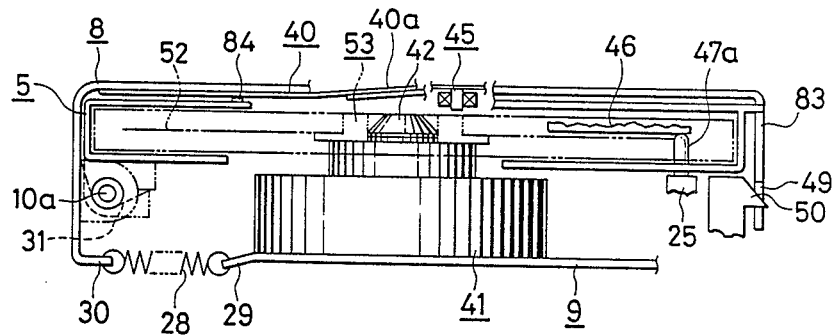
FIG. 10B is a cross sectional view showing the state when the garage of the recording apparatus is closed.

FIG. 10A shows the state that the garage 8 is opened and FIG. 10B illustrates the state that the garage 8 is closed. When the garage 8 is to be closed, the cassette 1 is set to the motor 41 with the compartment 5 being separated from the garage 8 by means of a spring 31. The garage 8 is further moved downwardly and at this time insertion spring 40 presses the center core 53 of the cassette 1 so that the spindle 42 is perfectly inserted into the center core 53. The insertion spring 40 has an elongated configuration and is, at one end portion, secured to the garage 8 and presses the center core 53 at the other end portion thereof. In response to a further movement of the garage 8, a convex portion 84 of the compartment 5 provided at the position facing the insertion spring 40 comes into contact with the insertion spring 40 and therefore one end portion 40a of the inserting spring 40 is moved upwardly and separated from the center core 53. This prevents the insertion spring 40 from affecting the rotation of the center core 53. This arrangement is simple and certainly performs the insertion of the spindle 42 into the center core 53, and separation from the center core 53. The Pulse Generator 45 and pad 46 provided on the pad plate 44 are accurately positioned by the pad spring 43, positioning pin 47a and so on.

Figure 11:
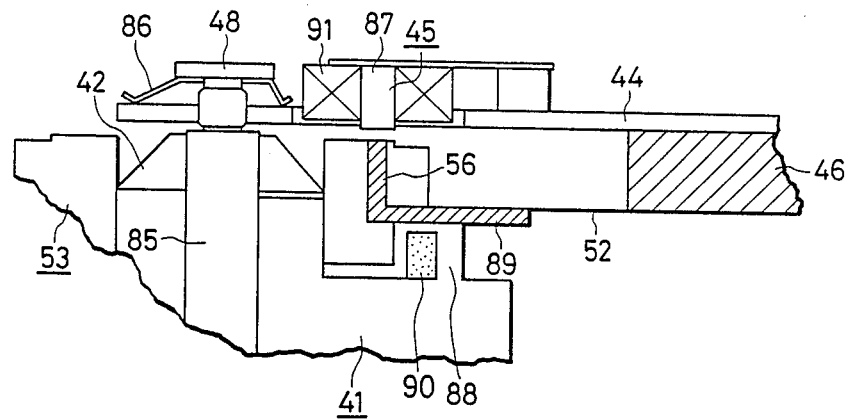
FIG. 11 is a cross sectional view partially illustrating the state when the garage is closed.

The pad 46 comes into contact with the positioning pins 47a and 47b and positioned in height. As shown in FIG. 11, the pad plate 44 is provided with a height adjusting screw 48 which is positioned above the center portion 85 of the motor 41 and which is urged by a spring 86 to prevent the adjusting screw 48 from loosening. Thus, it is ensured to accurately position the recording head 13 with respect to the magnetic sheet 52, and PG pin 87 with respect to PG yoke 56. The PG yoke 56 is integrally secured to a magnetic plate 89 which holds the magnetic sheet 52 and which comes into contact with a pedestal of the motor 41. The PG yoke 56 transfers the magnetic force from a magnet 90 to a PG pin 87. This is detected by a coil 91 which in turn generates a pulse signal.

Figure 12A:
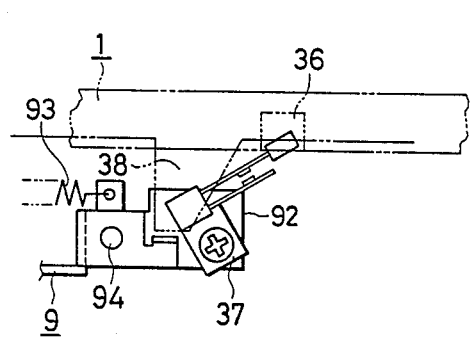
FIGS. 12A and 12B are illustrations of an arrangement for the removal of a safety switch associated with a safety lug of the cassette of FIG. 2.
Figure 12B:
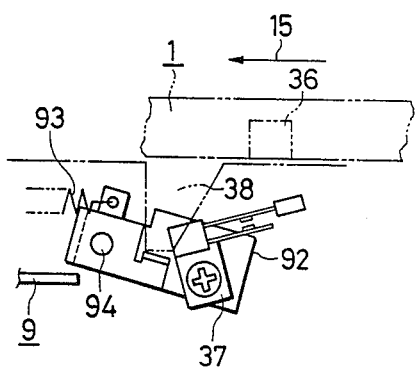

When the cassette 1 is inserted and removed, it will be required to remove the switch 37 associated with the error recording prevention lug 36. Therefore, as shown in FIGS. 12A and 12B, the garage 8 is provided with a projecting portion 38, and when the garage 8 is opened or when the cassette 1 is discharged from the compartment 5, the projecting portion 38 thereof is arranged to move a switch plate 92 against a spring 93 and separates the switch 37 from the cassette 1. That is, the switch plate 92 is pivotally secured to the side wall of the base plate 9 by a shaft 94 and one end portion thereof relative to the shaft 94 is biased by the spring 93. The other end portion thereof is pressed by the projecting portion 38 and rotated against the spring 93 in the direction when it is separated from the compartment 5.

It should be understood that foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. A recording apparatus for recording information by a recording head on a plural track recording medium in a cassette set therein, comprising:
    a first slide member held slidably by a chassis of said recording apparatus and engaged with said cassette in response to an insertion of said cassette into a cassette receiving compartment provided in said chassis so as to be slid, the moving direction of said first slide member being coincident with the insertion direction of said cassette into said cassette receiving compartment;
    a second slide member held slidably by said chassis and coupled through a spring to said first slide member to receive a biasing force of said spring produced in accordance with the movement of said first slide member caused by the insertion of said cassette, the biasing force between said first slide member and said second slide member being applied in such direction that the first slide member and the second slide member pull on each other;
    first stopper means engaged with said second slide member in response to the insertion of said cassette so as to hold the movement of said second slide member caused by the biasing force of said spring toward said first slide member;
    second stopper means engaged with said first slide member at the time of termination of the insertion of said cassette so as to hold the movement of said first slide member, caused by the biasing force of said spring, toward said second slide member; and
    transmission means for releasing said first slide member from said first stopper means after the termination of the insertion of said cassette so that said second slide member is movable toward said first slide member by means of the biasing force of said spring, said transmission means trasnferring the movement of said second slide member toward said first slide member to said recording head so that said recording head is moved across the plural track recording medium.

2. A recording apparatus as claimed in claim 1, further comprising a second spring provided between said first slide member and said chassis of said recording apparatus to apply a biasing force to said first slide member so that said first slide member is movable in the direction of discharge of said cassette from said cassette receiving compartment, said second spring, together with said first-mentioned spring, generating the biasing force in accordance with the insertion of said cassette into said cassette receiving compartment.

3. A recording apparatus as claimed in claim 2, further comprising release means for releasing said first slide member from said second stopper means at the time of the termination of recording so that said first slide member is moved by the biasing force applied thereto in a direction opposite to the direction of the insertion of said cassette and said cassette is removed in accordance with the movement of said first slide member.

4. A recording apparatus as claimed in claim 3, wherein said first and second slide members are close to each other by means of the biasing force of said first-mentioned spring when said first slide member is moved by means of said second spring and said first and second slide members come into contact with each other; and wherein after elimination of the biasing force of said first-mentioned spring as a result of the contact of said first and second slide members, said first slide member and said second slide member are moved together with each other by means of the biasing force of said second spring so that said recording head returns to an initial position.

5. A recording apparatus as claimed in claim 1, wherein said first and second slide members respectively have an elongaged configuration.

6. A recording apparatus as claimed in claim 5, wherein said cassette is set in a cassette receiving compartment provided in said recording apparatus, said cassette receiving compartment being rotated about an shaft whose axis is parallel to the longitudinal axes of said first and second slide members.

7. A recording apparatus as claimed in claim 3, wherein said transmission means includes a ratchet rotatable in a direction in accordance with the movement of said second slide member caused by the biasing force of said first-mentioned spring generated between said first and second slide members and rotatable in the opposite direction in accordance with the movement thereof caused by the biasing force of said second spring when said first member is released from said second stopper means, said transmission means further including first and second pawl members which are engageable with said ratchet, said first pawl member being biased by a third spring in the same direction as when said first pawl member separates from said ratchet and said second pawl member being biased by a fourth spring in the same direction as when said second pawl member engages with said ratchet.

8. A recording apparatus as claimed in claim 7, wherein said first and second pawl members are operatively coupled to pawl actuating means, said pawl actuating means actuating said first and second pawl members against said third and fourth springs so that said first pawl member is engaged with said ratchet and said second pawl member is disengaged therewith, whereby said ratchet is moved by a predetermined amount corresponding to the pitch of teeth of said ratchet, the movement of said ratchet by said predetermined amount causing said recording head to move along said recording medium by a predetermined distance through head drive means.

9. A recording apparatus as claimed in claim 7, wherein said ratchet is rotatable up to a predetermined position without being blocked by said first and second pawl members when said second slide member is moved in response to the release of said first slide member so that said recording head is returned to an initial position.

10. A recording apparatus as claimed in claim 8, wherein said head drive means includes a cam fixedly and axially secured to said ratchet, a cam follower urged into contact with said cam, and a slider member linearly movable in response to said cam, said recording head being provided on said slider member.

11. A recording apparatus as claimed in claim 8, wherein said first and second pawl members are spaced from each other during deactuation of said pawl actuating means.

12. A recording apparatus as claimed in claim 7, wherein said first stopper stops said second slide member when said second slide member is moved by a predetermined distance in response to the release of said first slide member; and wherein said second stopper member stops said ratchet when said ratchet is moved by a predetermined distance in response to the release of said first slide member.

13. A recording apparatus as claimed in claim 10, wherein said slider member is movable along first and second guide shafts, said first guide shaft being inserted into a hole defined in said slider member and held by a first leaf spring and a first position-adjusting screw, said second guide shaft being fitted in a channel defined in said slider member and held by a second leaf spring and a second position-adjusting screw, said first and second guide shafts being respectively adjustable in position by said first and second position-adjusting screws.

14. A recording apparatus as claimed in claim 1, further comprising ejector means for moving said recording head up to a predetermined position when said recording head is disengaged with said transmission means.

15. A recording apparatus as claimed in claim 14, wherein said ejector means includes first and second levers which are coupled through a second spring to each other, said first lever being coupled to said recording head and said second lever being actuated by an external force.

16. A recording apparatus as claimed in claim 15, wherein said first lever is stopped when said recording head has reached the predetermined position.

17. A recording apparatus as claimed in claim 15, further comprising a third lever provided for opening a cover of said recording apparatus, and wherein said second lever is arranged to press said third lever to open said cover.

18. A recording apparatus for recording information by a recording head on a plural track recording medium in a cassette set in a cassette receiving compartment of said recording apparatus, comprising:
a first slide member held slidably on a chassis of said recording apparatus and placed to be close to said cassette receiving compartment so that said cassette is engageable with said first slide member when said cassette is inserted into said cassette receiving compartment, said first slide member being slidable together with said cassette in the same direction, said first slide member being coupled through a first spring to said chassis so that a biasing force of said first spring is produced in response to the insertion of said cassette into said cassette receiving compartment and applied against said first slide member in a direction opposite to the inserting direction of said cassette;
a second slide member similarly held slidably on said chassis and coupled through a second spring to said first slide member so that a biasing force of said second spring is produced between said first and second slide members so as to pull said first and second slide members toward each other in response to the sliding movement of said first slide member, caused by the insertion of said cassette into said cassette receiving compartment;
first stopper means engaged with said second slide member when said first slide member is moved against the biasing forces of said first and second springs in accordance with the insertion of said cassette into said cassette receiving compartment so as to hold movement of said second slide member following the movement of said first slide member, caused by the insertion thereof;
second stopper means provided at a position of termination of the insertion of said cassette and engaged with said first slide member at the position to hold the movement of said first slide member, caused by the biasing force of said second spring, toward said second slide member;
release means for releasing said first slide member from said second stopper means at the time of termination of recording so that said first slide member is movable by the biasing forces applied thereto in the direction opposite to the direction of the insertion of said cassette; and
transmission means for driving said recording head with respect to said plural tracks by means of the biasing force of said second spring.

19. A recording apparatus as claimed in claim 18, wherein said transmission means returns said recording head to an initial position in response to the movement of said second slide member, caused by the release of said first slide member.

* * * * *